(12) United States Patent
Ryal (10) Patent No.: US 8,243,921 B1
(45) Date of Patent: Aug. 14, 2012

(54) DECRYPTION SYSTEM

(75) Inventor: Kim Annon Ryal, Poway, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 871 days.

(21) Appl. No.: 11/891,209

(22) Filed: Aug. 9, 2007

Related U.S. Application Data (62) Division of application No. 10/662,585, filed on Sep. 15, 2003, now Pat. No. 7,286,667.

(51) Int. Cl.
*H04N 7/167* (2011.01)

(52) U.S. Cl. .......... 380/200; 380/201; 725/31; 713/150; 713/193

(58) Field of Classification Search .................. 380/200, 380/201, 208, 210, 236, 42, 37; 713/150, 713/189, 193; 726/26, 33; 725/25, 31, 87
See application file for complete search history.

(56) References Cited

U.S. PATENT DOCUMENTS

| | | |
|---|---|---|
| 4,374,399 A | 2/1983 | Ensinger |
| 4,881,263 A | 11/1989 | Herbison et al. |
| 4,964,126 A | 10/1990 | Musicus et al. |
| 5,151,782 A | 9/1992 | Ferraro |
| 5,159,633 A | 10/1992 | Nakamura |
| 5,195,135 A | 3/1993 | Palmer |
| 5,414,852 A | 5/1995 | Kramer et al. |
| 5,477,263 A | 12/1995 | O'Callaghan et al. |
| 5,515,107 A | 5/1996 | Chiang et al. |
| 5,526,427 A | 6/1996 | Thomas et al. |
| 5,594,507 A | 1/1997 | Hoarty |
| 5,600,378 A | 2/1997 | Wasilewski |
| 5,629,866 A | 5/1997 | Carrubba et al. |
| 5,652,615 A | 7/1997 | Bryant et al. |
| 5,696,906 A | 12/1997 | Peters et al. |
| 5,726,702 A | 3/1998 | Hamaguchi et al. |
| 5,761,180 A | 6/1998 | Murabayashi et al. |
| 5,835,668 A | 11/1998 | Yanagihara |
| 5,838,873 A | 11/1998 | Blatter et al. |
| 5,892,900 A | 4/1999 | Ginter et al. |
| 5,905,732 A | 5/1999 | Fimoff et al. |
| 5,920,625 A | 7/1999 | Davies |

(Continued)

FOREIGN PATENT DOCUMENTS

CA 2389247 5/2001

(Continued)

OTHER PUBLICATIONS

"How Networks Work" Derfler and Freed, Ziff-Davis Press, 1996.

(Continued)

*Primary Examiner* — Edward Zee
*Assistant Examiner* — Suman Debnath
(74) *Attorney, Agent, or Firm* — Miller Patent Services; Jerry A. Miller (57) ABSTRACT

A method of generating a set of clear packets, involves receiving a selectively encrypted stream of data, detecting encrypted packets within the selectively encrypted stream of data, creating the set of clear packets by decrypting the encrypted packets detected within the selectively encrypted stream of data, and storing the set of clear packets as a computer file separate from the selectively encrypted stream of data. This abstract is not to be considered limiting, since other embodiments may deviate from the features described in this abstract without departing from the invention.

9 Claims, 6 Drawing Sheets

U.S. PATENT DOCUMENTS

| | | | |
|---|---|---|---|
| 5,920,626 A | 7/1999 | Durden et al. | |
| 5,926,624 A | 7/1999 | Katz et al. | |
| 5,933,498 A | 8/1999 | Schneck et al. | |
| 5,943,605 A | 8/1999 | Koepele, Jr. | |
| 5,973,726 A | 10/1999 | Iijima et al. | |
| 6,005,940 A | 12/1999 | Kulinets | |
| 6,057,832 A | 5/2000 | Lev et al. | |
| 6,061,471 A | 5/2000 | Coleman | |
| 6,064,676 A | 5/2000 | Slattery et al. | |
| 6,134,237 A | 10/2000 | Brailean et al. | |
| 6,148,205 A | 11/2000 | Cotton | |
| 6,170,075 B1* | 1/2001 | Schuster et al. | 714/776 |
| 6,181,364 B1 | 1/2001 | Ford | |
| 6,201,927 B1 | 3/2001 | Comer | |
| 6,219,358 B1 | 4/2001 | Pinder et al. | |
| 6,222,924 B1 | 4/2001 | Salomaki | |
| 6,223,290 B1 | 4/2001 | Larsen et al. | |
| 6,226,385 B1 | 5/2001 | Taguchi et al. | |
| 6,314,111 B1 | 11/2001 | Nandikonda et al. | |
| 6,314,409 B2 | 11/2001 | Schneck et al. | |
| 6,323,914 B1 | 11/2001 | Linzer | |
| 6,327,421 B1 | 12/2001 | Tiwari et al. | |
| 6,337,947 B1 | 1/2002 | Porter et al. | |
| 6,351,813 B1 | 2/2002 | Mooney et al. | |
| 6,418,169 B1 | 7/2002 | Datari | |
| 6,424,717 B1 | 7/2002 | Pinder et al. | |
| 6,452,923 B1 | 9/2002 | Gerszberg et al. | |
| 6,453,116 B1 | 9/2002 | Ando et al. | |
| 6,463,445 B1 | 10/2002 | Suzuki et al. | |
| 6,473,459 B1 | 10/2002 | Sugano et al. | |
| 6,480,551 B1 | 11/2002 | Ohishi et al. | |
| 6,490,728 B1 | 12/2002 | Kitazato et al. | |
| 6,526,144 B2 | 2/2003 | Markandey et al. | |
| 6,550,008 B1 | 4/2003 | Zhang et al. | |
| 6,621,866 B1 | 9/2003 | Florencio et al. | |
| 6,621,979 B1 | 9/2003 | Eerenberg et al. | |
| 6,640,305 B2 | 10/2003 | Kocher et al. | |
| 6,643,298 B1 | 11/2003 | Brunheroto et al. | |
| 6,697,489 B1 | 2/2004 | Candelore | |
| 6,701,258 B2 | 3/2004 | Kramb et al. | |
| 6,704,733 B2 | 3/2004 | Clark et al. | |
| 6,707,696 B1 | 3/2004 | Turner et al. | |
| 6,741,795 B1 | 5/2004 | Takehiko et al. | |
| 6,788,882 B1 | 9/2004 | Geer et al. | |
| 6,853,728 B1 | 2/2005 | Kahn et al. | |
| 6,883,050 B1 | 4/2005 | Safadi | |
| 6,925,180 B2 | 8/2005 | Iwamura | |
| 6,973,187 B2 | 12/2005 | Gligor et al. | |
| 6,976,166 B2* | 12/2005 | Herley et al. | 713/165 |
| 6,988,238 B1 | 1/2006 | Kovacevic et al. | |
| 7,023,924 B1 | 4/2006 | Keller et al. | |
| 7,039,802 B1 | 5/2006 | Eskicioglu et al. | |
| 7,055,166 B1 | 5/2006 | Logan et al. | |
| 7,079,752 B1 | 7/2006 | Leyendecker | |
| 7,089,579 B1 | 8/2006 | Mao et al. | |
| 7,096,481 B1 | 8/2006 | Forecast et al. | |
| 7,096,487 B1 | 8/2006 | Gordon et al. | |
| 7,110,659 B2 | 9/2006 | Fujie et al. | |
| 7,139,398 B2 | 11/2006 | Candelore et al. | |
| 7,146,007 B1 | 12/2006 | Maruo et al. | |
| 7,158,185 B2 | 1/2007 | Gastaldi | |
| 7,194,192 B2 | 3/2007 | Ko et al. | |
| 7,194,758 B1 | 3/2007 | Waki et al. | |
| 7,221,706 B2 | 5/2007 | Zhao et al. | |
| 7,292,692 B2* | 11/2007 | Bonan et al. | 380/212 |
| 7,298,959 B1 | 11/2007 | Hallberg et al. | |
| 7,336,785 B1 | 2/2008 | Lu et al. | |
| 7,336,787 B2* | 2/2008 | Unger et al. | 380/217 |
| 7,391,866 B2 | 6/2008 | Fukami et al. | |
| 7,490,236 B2 | 2/2009 | Wasilewski | |
| 7,490,344 B2 | 2/2009 | Haberman et al. | |
| 7,496,198 B2 | 2/2009 | Pinder et al. | |
| 7,508,454 B1 | 3/2009 | Vantalon et al. | |
| 7,555,123 B2 | 6/2009 | Pinder et al. | |
| 2001/0013123 A1 | 8/2001 | Freeman et al. | |
| 2001/0017885 A1 | 8/2001 | Asai et al. | |
| 2001/0024471 A1 | 9/2001 | Bordes et al. | |
| 2002/0021805 A1 | 2/2002 | Schumann et al. | |
| 2002/0023013 A1 | 2/2002 | Hughes et al. | |
| 2002/0026478 A1 | 2/2002 | Rodgers et al. | |
| 2002/0036717 A1 | 3/2002 | Abiko et al. | |
| 2002/0044558 A1 | 4/2002 | Gobbi et al. | |
| 2002/0056093 A1 | 5/2002 | Kunkel et al. | |
| 2002/0065678 A1 | 5/2002 | Peliotis et al. | |
| 2002/0067436 A1 | 6/2002 | Shirahama et al. | |
| 2002/0083439 A1 | 6/2002 | Eldering | |
| 2002/0100054 A1 | 7/2002 | Feinberg et al. | |
| 2002/0109707 A1 | 8/2002 | Lao et al. | |
| 2002/0144116 A1 | 10/2002 | Giobbi | |
| 2002/0144260 A1 | 10/2002 | Devara | |
| 2002/0157115 A1 | 10/2002 | Lu | |
| 2002/0194589 A1 | 12/2002 | Cristofalo et al. | |
| 2003/0021412 A1 | 1/2003 | Candelore et al. | |
| 2003/0026423 A1 | 2/2003 | Unger et al. | |
| 2003/0026432 A1 | 2/2003 | Woodward | |
| 2003/0028879 A1 | 2/2003 | Gordon et al. | |
| 2003/0034997 A1 | 2/2003 | McKain et al. | |
| 2003/0035482 A1 | 2/2003 | Klompenhouwer et al. | |
| 2003/0035540 A1 | 2/2003 | Freeman et al. | |
| 2003/0035543 A1 | 2/2003 | Gillon | |
| 2003/0046687 A1 | 3/2003 | Hodges et al. | |
| 2003/0079133 A1 | 4/2003 | Breiter et al. | |
| 2003/0108199 A1 | 6/2003 | Pinder et al. | |
| 2003/0152232 A1* | 8/2003 | Pirila et al. | 380/270 |
| 2003/0174837 A1 | 9/2003 | Candelore et al. | |
| 2003/0188164 A1 | 10/2003 | Okimoto et al. | |
| 2004/0003281 A1 | 1/2004 | Sonoda et al. | |
| 2004/0037421 A1 | 2/2004 | Truman | |
| 2004/0078338 A1 | 4/2004 | Ohta et al. | |
| 2004/0083177 A1 | 4/2004 | Chen et al. | |
| 2004/0088558 A1 | 5/2004 | Candelore | |
| 2004/0168121 A1 | 8/2004 | Matz | |
| 2004/0172650 A1 | 9/2004 | Hawkins et al. | |
| 2004/0247122 A1 | 12/2004 | Hobrock et al. | |
| 2004/0261099 A1 | 12/2004 | Durden et al. | |
| 2004/0264924 A1 | 12/2004 | Campisano et al. | |
| 2005/0015816 A1 | 1/2005 | Christofalo et al. | |
| 2005/0028193 A1 | 2/2005 | Candelore et al. | |
| 2005/0172127 A1 | 8/2005 | Hartung et al. | |
| 2005/0198586 A1 | 9/2005 | Sekiguchi et al. | |
| 2005/0228752 A1 | 10/2005 | Konetski et al. | |
| 2005/0271205 A1 | 12/2005 | Shen et al. | |
| 2005/0283797 A1 | 12/2005 | Eldering et al. | |
| 2006/0036554 A1 | 2/2006 | Schrock et al. | |
| 2006/0130121 A1 | 6/2006 | Candelore et al. | |
| 2007/0006253 A1 | 1/2007 | Pinder et al. | |
| 2007/0091886 A1 | 4/2007 | Davis et al. | |
| 2007/0100701 A1 | 5/2007 | Boccon-Gibod et al. | |
| 2009/0210698 A1 | 8/2009 | Candelore | |

FOREIGN PATENT DOCUMENTS

| | | |
|---|---|---|
| EP | 0 696 141 | 7/1995 |
| EP | 0720374 | 7/1996 |
| EP | 0382764 | 4/1997 |
| EP | 0 926 894 | 6/1999 |
| JP | 61-264371 | 11/1986 |
| JP | 07-046575 | 2/1995 |
| JP | 09-251714 | 9/1997 |
| JP | 10-336624 | 12/1998 |
| JP | 2000-125260 | 4/2000 |
| JP | 2001-69480 | 3/2001 |
| JP | 2001-117809 | 4/2001 |
| JP | 2001-242786 | 9/2001 |
| JP | 2003-122710 | 4/2003 |
| KR | 2001-0093609 | 10/2001 |
| KR | 299634 | 8/2008 |
| WO | WO 93/09525 | 5/1993 |
| WO | WO 94/13081 | 6/1994 |
| WO | WO 94/13107 | 6/1994 |
| WO | WO 95/28058 | 4/1995 |
| WO | WO 97/46009 | 12/1997 |
| WO | WO 98/08341 | 2/1998 |
| WO | WO 00/31964 | 6/2000 |
| WO | WO 00/59203 | 10/2000 |
| WO | WO 00/60846 | 10/2000 |
| WO | WO 00/64164 | 10/2000 |
| WO | WO 00/70817 | 11/2000 |

| | | |
|---|---|---|
| WO | WO 01/26372 | 4/2001 |
| WO | WO 01/35669 | 5/2001 |
| WO | WO 01/67667 | 9/2001 |
| WO | WO 02/51096 | 6/2002 |

OTHER PUBLICATIONS

"How Computers Work—Millennium Edition," Ron White, Que Corporation, 1999.

"How the Internet Works—Millennium Edition," Preston Gralla, Que Corporation, 1999.

"Desktop Encyclopedia of the Internet," Nathan J. Muller, Artech House, 1999.

"MPEG-2 Transmission," Dr. Gorry Fairhurst, Jan. 2001.

U.S. Appl. No. 10/662,585, filed Sep. 15, 2003.

Microsoft Windows XP, Oct. 2001, Microsoft, Screen Shots and Help Files.

MPEG-2 Digital Broadcast Pocket Guide vol. 6, Copyright 201 Acterna, LLC.

"MPEG-2 Compliant Trick Play Over a Digital Interface," van Gassel et al., IEEE pp. 170-171., 2002.

"K-Time Encryption for K-Time Licensing," Perkins, et al., IEEE, 2002.

"Partial Encryption of Compressed Images and Videos," Howard Cheng et al. IEEE 2000.

"Secure Transmission of MPEG Video Sources," Teixeira et al., date unknown.

"DVB Conditional Access," David Cutts, Electronics and Communication Engineering Journal, Feb. 1997.

Anonymous—Functional Model of a Condtional Access System; EBU Project Group B/CA, EBU Review Technical, Winter No. 266, Grand-Saconnex, CH; pp. 64-77; 1995.

Perry et al, "Final Report of the Co-Chairs of the Broadcast Protection Discussion Subgroup to the Copy Protection Technical Working Group," Jun. 3, 2003.

Anonymous, Rehabilitation of Digital Television, CEATEC Japan 2003, Special Report, Jan. 2003. (*Translation provided by Japanese associate*).

Teixeira et al., Secure Transmission of MPEG Video Sources, Nov. 6, 1998 (*Resubmitted with date provided by Wayback machine.*).

Bungum, O.W., "Transmultiplexing, Transcontrol and Transscrambling of MPEG-2/DVB Signal," International Broadcasting Convention, Conference Publication No. 428, pp. 288-293, Sep. 1996.

Parviainen, Roland and Parnes, Peter, "Large Scale Distributed Watermarking of Multicast Media Through Encryption," 2001.

* cited by examiner

DECRYPTION SYSTEM

CROSS REFERENCE TO RELATED DOCUMENTS

This application is a divisional of allowed U.S. patent application Ser. No. 10/662,585 filed Sep. 15, 2003 now U.S. Pat. No. 7,286,667 and is related to the following issued patents and copending patent applications which are hereby incorporated herein by reference:

Ser. No. 10/038,217 filed Jan. 2, 2002,
Ser. No. 10/038,032 filed Jan. 2, 2002, now U.S. Pat. No. 7,139,398 issued Nov. 21, 2006,
Ser. No. 10/037,914 filed Jan. 2, 2002, now U.S. Pat. No. 7,124,303 issued Oct. 17, 2006,
Ser. No. 10/037,499 filed Jan. 2, 2002, now U.S. Pat. No. 7,151,831 issued Dec. 19, 2006,
Ser. No. 10/037,498 filed Jan. 2, 2002, now U.S. Pat. No. 7,127,619 issued Oct. 24, 2006,
Ser. No. 10/084,106 filed Feb. 2, 2002,
Ser. No. 10/273,905 filed Oct. 18, 2002,
Ser. No. 10/273,903 filed Oct. 18, 2002,
Ser. No. 10/273,875 filed Oct. 18, 2002, now U.S. Pat. No. 7,218,738 issued May 15, 2007,
Ser. No. 10/274,084 filed Oct. 18, 2002, now U.S. Pat. No. 7,155,012 issued Dec. 26, 2006,
Ser. No. 10/273,904 filed Oct. 18, 2002, now U.S. Pat. No. 7,242,773 issued Jul. 10, 2007,
Ser. No. 10/274,019 filed Oct. 18, 2002,
Ser. No. 10/293,761 filed Nov. 13, 2002,
Ser. No. 10/303,594 filed Nov. 25, 2002,
Ser. No. 10/319,133 filed Dec. 13, 2002, now U.S. Pat. No. 7,039,938 issued May 2, 2007,
Ser. No. 10/319,066 filed Dec. 13, 2002,
Ser. No. 10/318,782 filed Dec. 13, 2002, now U.S. Pat. No. 7,120,250 issued Oct. 10, 2006,
Ser. No. 10/319,169 filed Dec. 13, 2002, now U.S. Pat. No. 7,233,669 issued Jun. 19, 2007,
Ser. No. 10/391,940 filed Mar. 19, 2003, now U.S. Pat. No. 7,151,833 issued Dec. 19, 2006.
Ser. No. 10/393,324 filed Mar. 20, 2003.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Selective encryption systems, including but not limited to dual or multiple selective encryption systems are disclosed in the above-referenced patent applications. Such systems are useful in providing encryption of program material under multiple conditional access systems.

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

BRIEF DESCRIPTION OF THE DRAWINGS

Certain illustrative embodiments of the invention illustrating organization and method of operation, together with objects and advantages thereof, may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles of the invention and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated into television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

The selective encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the above inventions, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

Figure 1:
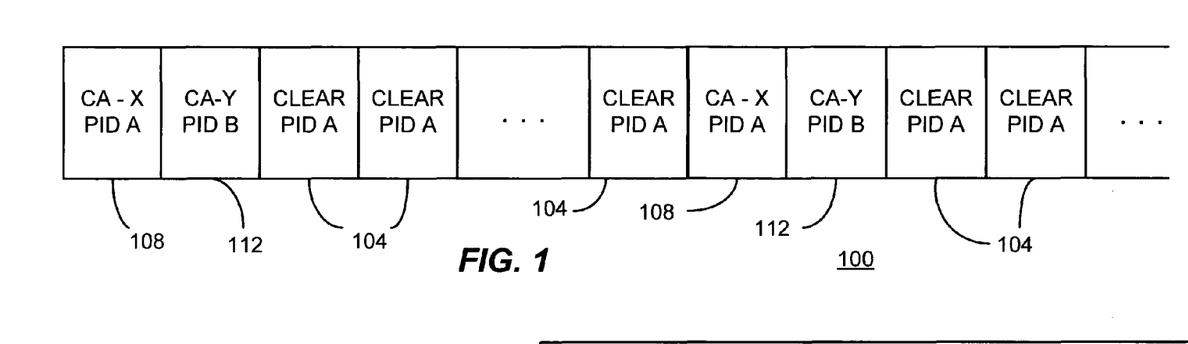
FIG. 1 is a diagram depicting a dual selectively encrypted data stream consistent with certain embodiments of the present invention.

In order to distinguish between the two or more digital television signals encrypted using the multiple encryption algorithms in accordance with certain embodiments consistent with the above inventions, multiple packet identifiers (PIDs) are utilized. This is illustrated in the dual selectively encrypted data stream shown in FIG. 1 as data stream 100. Normally a single set of packet identifiers is used to identify a data stream associated with a particular television program. When a television signal or other content is encrypted under the multiple selective encryption arrangement described in the above-referenced applications, the clear content shown as packets 104 is assigned a first set of PIDs (PID A), and each set of encrypted content is assigned another set of PIDs. In this example, one set of encrypted content shown as packets 108 encrypted under a first conditional access (CA) encryption system (CA system X) may share the same PID (PID A) with the unencrypted content, but this should not be considered limiting. CA system X may, for example represent a so called "legacy" encryption system. A second set of encrypted content shown as packets 112 is encrypted under a second CA encryption system (CA system Y) and encoded with a second PID (PID B). In this example, consecutive packets 108 and 112 contain the same content encrypted under two different CA systems.

Figure 2:
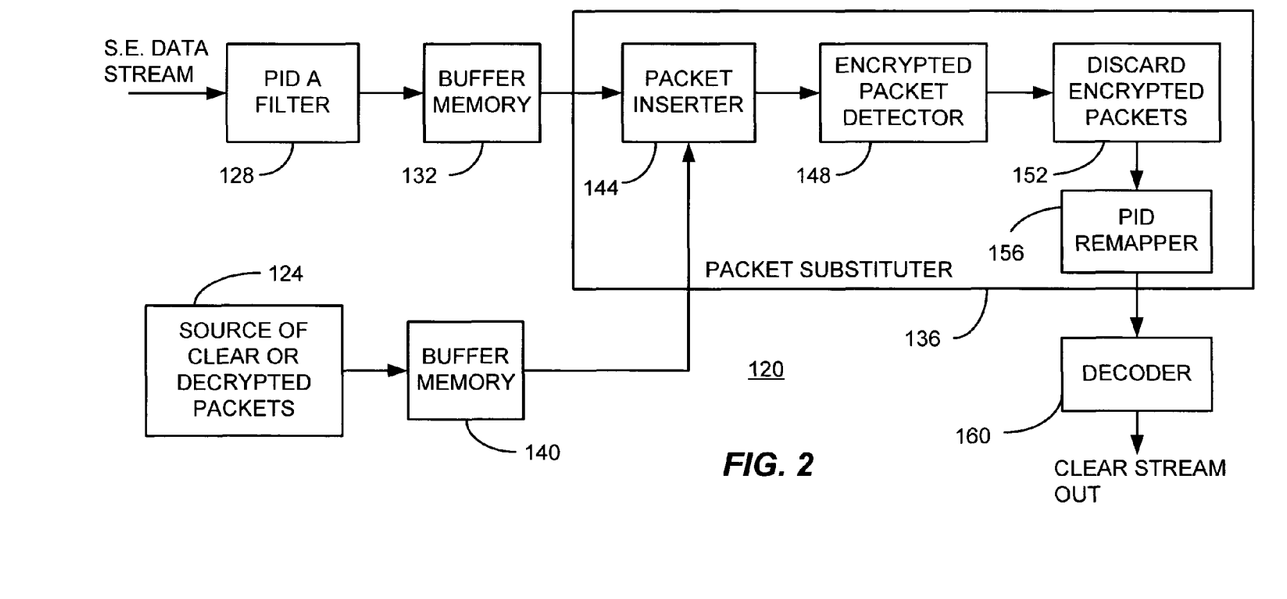
FIG. 2 is a block diagram of a decoding system consistent with certain embodiments of the present invention.

Turning now to FIG. 2, a device 120 is depicted in which a source of clear packets 124 is utilized to provide a set of clear packets from a selectively encrypted stream of packets. In this exemplary embodiment, a selectively encrypted data stream such as 100 is received as an input (e.g., through a tuner and a receiver device forming a part of a television Set-Top Box (STB) or other video receiver system. The stream of selectively encrypted data is processed by a PID filter 128 which selects, for example, the stream of data represented by values of PID equal to PID A in stream 100. In this example, the output of the PID filter 128 would have only packets identified by PID A. This stream of data having only PID A is buffered in a buffer memory 132 in certain embodiments before being provided to a packet substitution circuit 136. Packet substitution circuit 136 also receives an input from the source of clear or decrypted packets 124, which may be buffered at buffer memory 140.

In accord with certain embodiments, the source of clear or decrypted packets 124 may be a magnetic, optical or magneto-optical or semiconductor storage device, for example, a CD ROM (Compact Disc Read Only Memory) or a hard disk drive or an Flash ROM. In other embodiments, the source of clear or decrypted packets may be a remote source that streams or otherwise transmits the clear or decrypted packets over a network such as the Internet. Such packets may be transmitted over either a wideband or a dial-up connection.

In this example, the source of clear packets may be encoded with PID B or some other PID to identify the packets. Such clear or decrypted packets having PID B are provided to the packet substituter 136 where they are inserted into place in the data stream containing PID A packets by a packet inserter 144. The packets should preferably be inserted at a position adjacent the encrypted packets with PID A. Thus, at the output of packet inserter 144 a data stream similar to that of FIG. 1 appears except that the packets 112 having PID B are now in the clear rather than being encrypted.

From here, the stream can be converted to a clear data stream by detecting the encrypted packets with PID A at encrypted packet detector 148 and discarding those packets at 152. Since encrypted packets can contain a flag bit that indicates that the packet is encrypted, the process of detecting and discarding the encrypted packets is a simple matter of reading the encryption flag and discarding all encrypted packets. At this point, the data stream contains packets with PID A which are clear and Packets with PID B which are also clear. In order to use certain standard decoders (e.g., an MPEG decoder), such as 160, it may be desirable that all packets in a particular elementary stream have the same PID. Thus, at 156, the packets having PID B can be re-mapped to have PID A. This produces a clear data stream with all packets having PID A and all packets being unencrypted. In other embodiments, decoder 160 can be programmed to accept multiple PIDs in the same data stream. This process can be carried out in a circuit 120 without need for a decryptor since no decryption actually takes place at the device 120.

Figure 3:
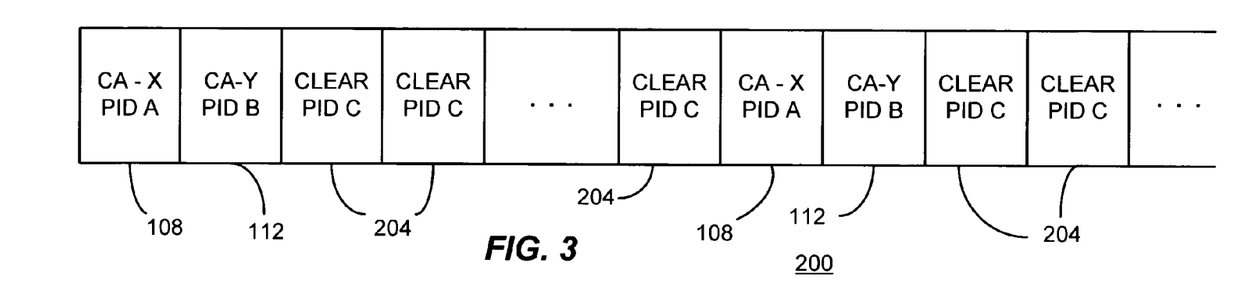
FIG. 3 is a drawing depicting another embodiment of a dual selectively encrypted data stream consistent with certain embodiments of the present invention.

It will be appreciated by one skilled in the art upon consideration of the present teaching that other configurations of data in the selectively encrypted data stream can be decoded using the same, similar or analogous circuitry. One example of another configuration of a selectively encrypted data stream is depicted in FIG. 3 as data stream 200. In this exemplary embodiment, the selectively encrypted packets 108 having PID A encrypted under CA system X and the selectively encrypted packets 112 having PID B encrypted under CA system Y are combined with clear packets 204 having PID C.

Figure 4:
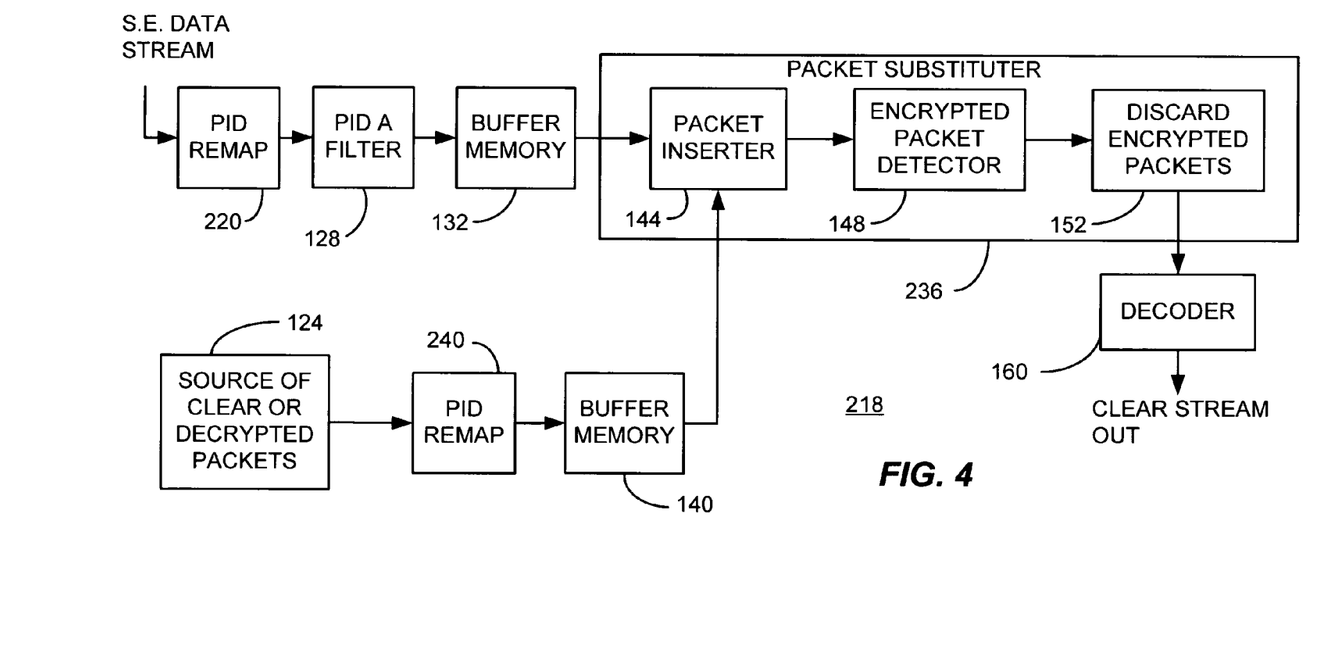
FIG. 4 is a block diagram of another embodiment of a decoding system consistent with certain embodiments of the present invention.

In this embodiment, the data stream may be processed using the circuit 218 of FIG. 4, the incoming selectively encrypted data stream can be processed by a PID re-mapping circuit 220 to convert the PID C packets to PID A (or equivalently, the PID A packets can be converted to PID B, both can be mapped to another PID, or other mappings can be used). In this example, the re-mapped stream from 220 is then passed to a PID filter 128 that in this case is configured to throw away packets except those having PID A. Thus, the PID B packets are discarded at PID filter 128.

The packets from PID filter 128 can be buffered at a buffer memory 132 and then provided to the packet substituter 236. The source of clear or decrypted packets 124 can provide packets to a PID re-mapper 240 that re-maps the PID of the clear packets to PID A. The PID re-mapper 240's output can be buffered by buffer 140 and then provided to the packet inserter 144 of packet substituter 236. Packet inserter 144 then inserts the clear PID A packets into the data stream so that all packets now have PID A and the only remaining task is to remove the encrypted packets as before at 148 and 152 (e.g., by PID filtering). In other embodiments, equivalently, the encrypted packets can remain in place if ignored by the decoder 160.

In another embodiment, the PID re-mapper 220 of FIG. 4 may be omitted as can the PID filter 128. In this example, clear packets from 124 may also not require remapping at 240. In order to effect the packet substitution, the clear packets from 124 are inserted into the data stream adjacent the encrypted packets and the encrypted packets can be removed using PID filtering if the encrypted packets have different PID values from the clear packets. If not, the encrypted flag can be used to identify and delete the encrypted packets. Other varia-tions will occur to those skilled in the art. Preferably, at the output of the packet substituter, all PIDs wind up the same when provided to the decoder 160. However, this is not an absolute requirement if the decoder can deal with multiple PID values for a single elementary data stream.

It should be clear to those skilled in the art upon consideration of this teaching that the particular PID assignments used in a particular selectively encrypted data stream as well as the PID assignments for the clear data from 120 is not particularly important as long as they can be determined in a manner that permits the desired substitution, and in some instances, remapping to a single PID value for decoding. Thus, any suitable PID mapping can be used without departing from certain embodiments consistent with the present invention.

Figure 5:
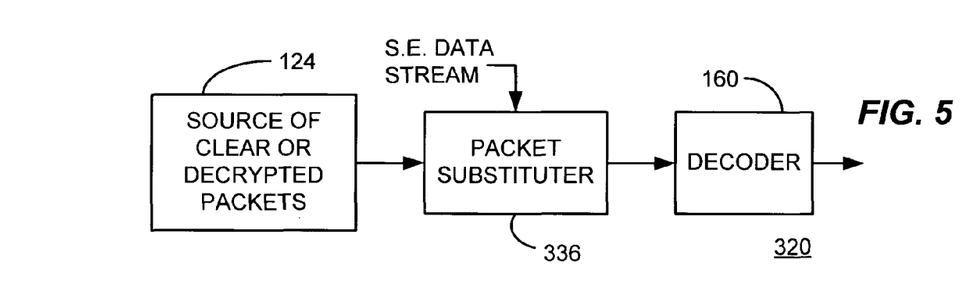
FIG. 5 is another embodiment of a decoder system consistent with certain embodiments of the present invention.

The various systems described above can be generically represented by the block diagram of circuit 320 of FIG. 5 in which a single or multiple selectively encrypted data stream is processed by a packet substituter 336 in which a source of clear packets 124 provides clear packets which are substituted for the encrypted packets in the input data stream. This produces a stream of clear packets that can be decoded by a suitable decoder 160. Thus, an apparatus for manipulating a selectively encrypted data stream in a manner consistent with certain embodiments has a filter that selects a set of packets from the selectively encrypted data stream based upon packet identifier values to produce a stream of packets having clear packets and encrypted packets. A packet substituter inserts a clear version of the encrypted packets into the stream of packets in place of the encrypted packets to produce a stream of clear data.

Figure 6:
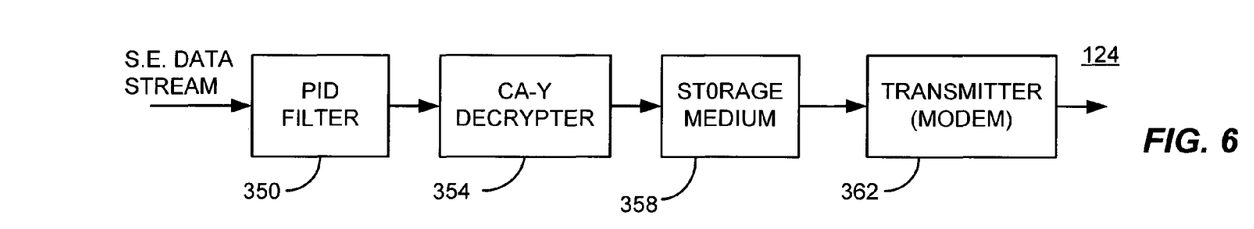
FIG. 6 is a block diagram of a system for generating a stream or file of clear packets in a manner consistent with certain embodiments of the present invention.

The above-referenced systems and processes use a source of clear packets that can be either supplied as a data stream or computer file, etc. from the original source of the content (or subsequent processor), or can be generated by decryption of selectively encrypted content. FIG. 6 depicts one exemplary system that can act as source 124 of the decrypted packets. In this system, the selectively encrypted data stream such as 100 is provided as an input. The system first identifies one of the two sets of encrypted packets to decrypt. In this case, this is easily accomplished using a PID B filter 350 to select the packets encrypted under the encryption process defined by conditional access system Y. (In other embodiments, packets could be selected by selecting encrypted packets with PID A.) These packets are then decrypted using CA decryption system 354 to produce a set of packets that are decrypted. This set of packets represents only one set of the encrypted packets, and thus is much smaller generally than the entire content represented by the selectively encrypted data stream. This set of packets can then be stored as a computer file on a computer readable storage medium 358 and/or transmitted using a transmitting device such as a broadband or narrowband modem 362 to a remote location where the decoding of the selectively encrypted data stream is to take place. In some cases, the storage medium can be, for example, an optical disk or a magnetic disk or semiconductor storage device. Such devices can then either be directly distributed to an end user or used as a source for later transmission, e.g., over the Internet.

Therefore, an apparatus for supplying decrypted packets for substitution in place of encrypted packets in a selectively encrypted data stream in a manner consistent with certain embodiments has an encrypted packet detector that detects a set of encrypted packets in the selectively encrypted data stream and discards packets in the data stream that are not encrypted. A decrypter decrypts the set of encrypted packets in the selectively encrypted data stream to produce a set of decrypted clear packets, wherein the decrypted clear packets can be substituted for the encrypted packets in the selectively encrypted data stream.

Figure 7:
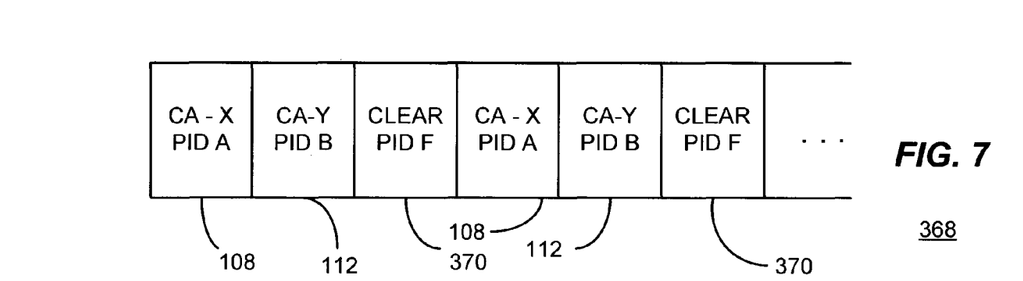
FIG. 7 is a diagram showing another arrangement of clear packets that can be used in certain embodiments consistent with of the present invention.

In another embodiment, a file or stream of data packets 368 as depicted in FIG. 7 can be utilized. In this embodiment, when the decrypter 354 of FIG. 6 decrypts the encrypted packets, they are stored along with the encrypted packets at a position adjacent one or more of the encrypted packets. In this example, the packets 108 with PID A encrypted under CA system X are followed by a packet 112 containing identical data except encrypted under CA system Y and having PID B. These packets are then followed by a clear packet 370 containing the decrypted version of the packet's payload, which may have any selected PID (shown as PID F). This arrangement can be modified in the order of presentation of the packets or can only, for example contain one of the encrypted versions of the packets. (either 108 or 112) in other exemplary embodiments. This file or data stream can then be sent to the decoding device. In this embodiment, the selectively encrypted data stream can be easily modified by matching one or both of packets 108 and 112 to the packets in the original data stream. The placement of the clear packets 370 (in this case, immediately following the encrypted packets) identifies the packets that can be substituted for the encrypted packets.

Any of the above decoding techniques can be implemented in a television STB that has had software modifications to facilitate the operation as described. Also, the above techniques can be implemented in any suitable video player device including, but not limited to, a personal computing device or television receiver.

Figure 8:
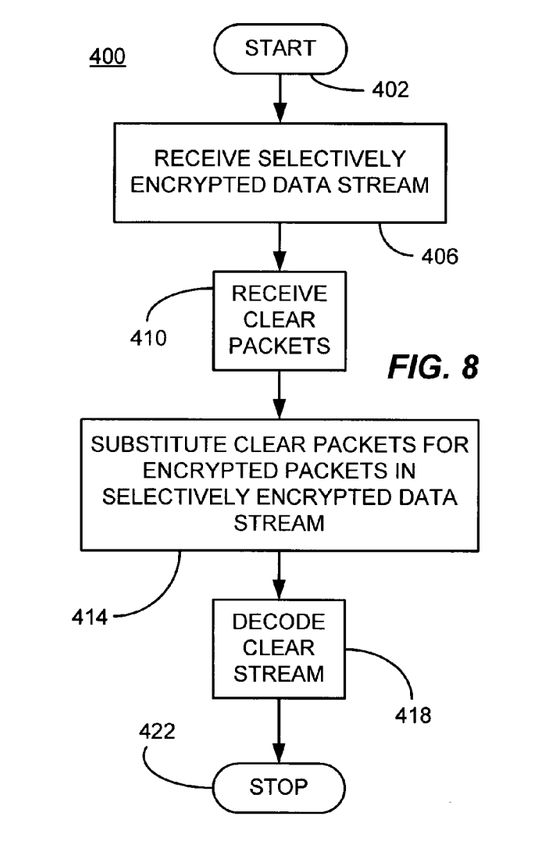
FIG. 8 is a flow chart of a decoding method consistent with certain embodiments of the present invention.

The basic decoding processes just described can be carried out by the process 400 shown in FIG. 8. starting at 402. At 406 a selectively encrypted data stream is received and a set of clear packets is received at 410. The clear packets can be received and stored prior to receipt of the selectively encrypted data stream, or the process can occur substantially simultaneously. At 414, the clear packets are substituted for the encrypted packets in the selectively encrypted data stream to produce a clear data stream. This clear data stream can then be decoded and played at 418. The process ends at 422 after the last substitution and decoding has taken place.

Thus, a method of decoding a selectively encrypted data stream consistent with certain embodiments involves receiving the selectively encrypted data stream from a first source; receiving a set of clear packets from a second source, the set of clear packets containing data representing an unencrypted version of the encrypted packets present in the selectively data stream; detecting a plurality of encrypted packets forming a part of the selectively encrypted data stream; and substituting the clear packets for the encrypted packets to form a clear data stream.

Figure 9:
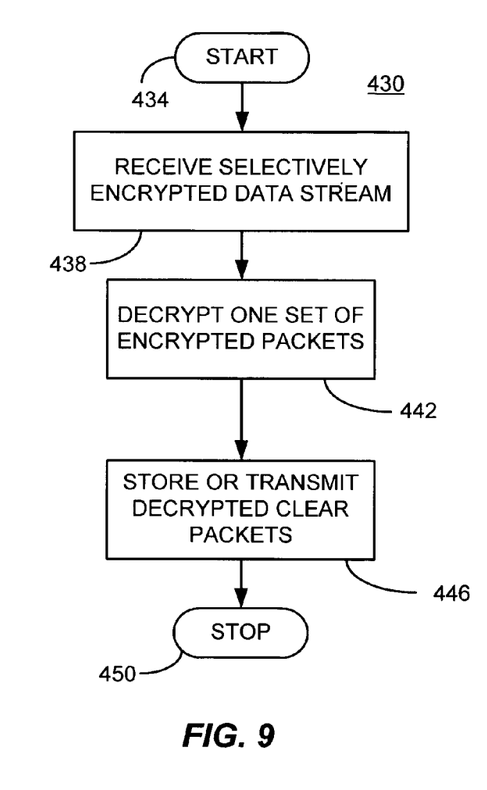
FIG. 9 is a flow chart of a clear packet generation method consistent with certain embodiments of the present invention.

One process described above for creation of the file or data stream containing the clear data stream is depicted as process 430 of FIG. 9 starting at 434. A file or data stream of the selectively encrypted content is received at 438 and is decrypted using an appropriate decrypter to produce a set of clear packets corresponding to the encrypted packets originally appearing in the selectively encrypted content at 442. This set of clear packets is then stored and/or transmitted to another decoding device at 446 and the process ends at 450.

Thus, a method of generating a set of clear packets consistent with certain embodiments involves receiving a selectively encrypted stream of data; detecting encrypted packets within the selectively encrypted stream of data; creating a set of clear packets by decrypting the encrypted packets detected within the selectively encrypted stream of data. Additionally, a method of facilitating decoding of a selectively encrypted data stream involves creating a set of clear packets corresponding to a set of encrypted packets present in the selectively encrypted data stream; and providing the set of clear packets to a decoder for substitution in place of the set of encrypted packets present in the selectively encrypted data stream.

Figure 10:
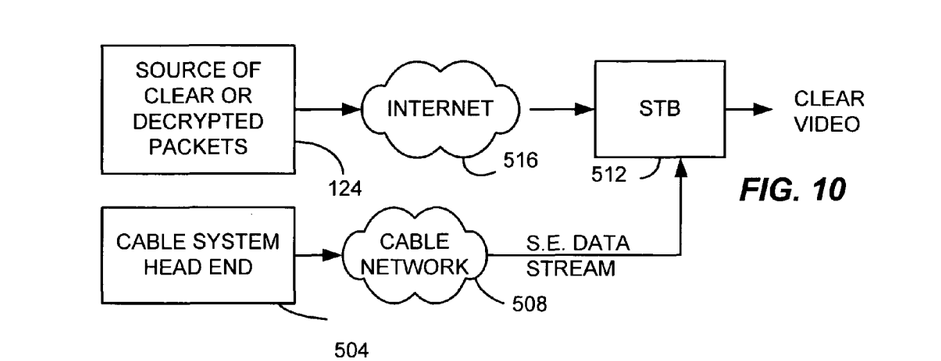
FIG. 10 is a block diagram of a decoding system consistent with certain embodiments of the present invention.
Figures 11, 12:
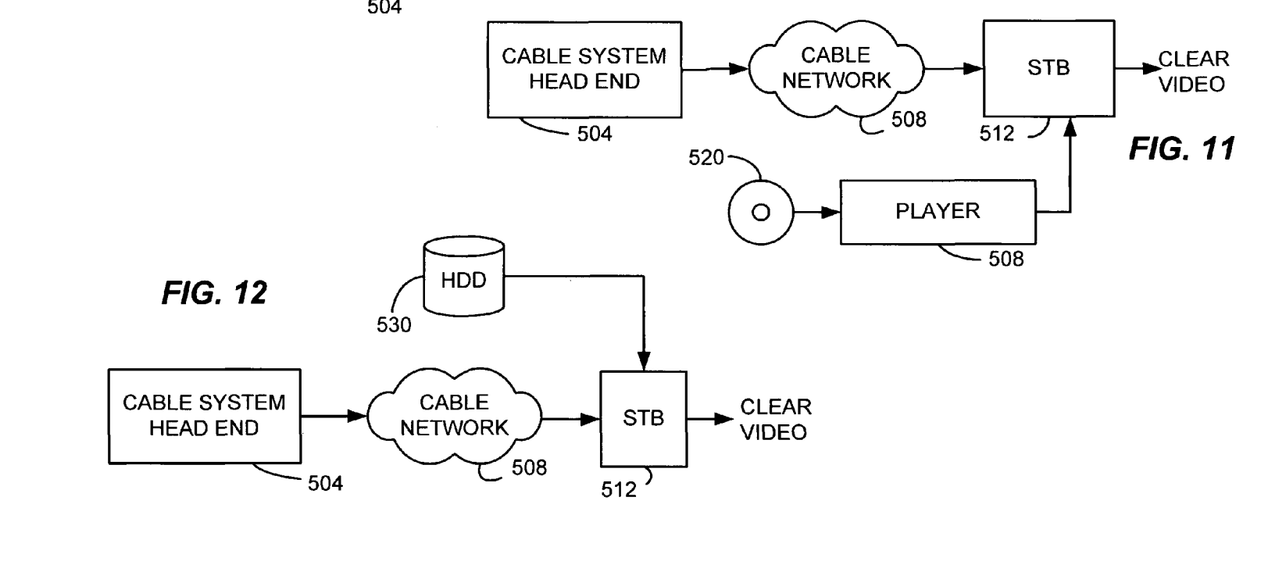
FIG. 11 is a block diagram of another decoding system consistent with certain embodiments of the present invention.
FIG. 12 is a block diagram of another decoding system consistent with certain embodiments of the present invention.

The decoding mechanism previously described can be realized in many ways to decode programming from, for example, a cable television or satellite television network. By way of example, and not limitation, FIGS. 10-12 depict several overall systems in which certain embodiments of the present invention can be utilized to decode selectively encrypted content. In FIG. 10, a cable television system headend 504 transmits content that is selectively encrypted through cable network 508 to a television Set-Top Box 512 for decoding. In order to decode the content, a source of clear packets 124 corresponding to a set of the selectively encrypted packets transmits the clear packets via, for example, the Internet 516 or electronic mail to the STB 512's internal modem. The STB 512 software then implements a decoding process such as one of the exemplary processes previously described.

A similar process can be used to decode the selectively encrypted content in the system depicted in FIG. 11, except that in this exemplary embodiment, the clear packets are received, e.g., by virtue of a subscription service, in the form of a computer readable storage medium such as a Compact Disc (CD) or Digital Versatile Disc (DVD) 520. In other embodiments, the clear packets could equally well be supplied in the form of semiconductor storage devices or any other suitable computer readable storage medium. The storage medium is played in a suitable player 524 in order to access the clear packets. The clear packets are thus supplied to STB 512 which operates in a manner similar to that previously described except that the source of clera packets is different.

A similar process can be used to decode the selectively encrypted content in the system depicted in FIG. 12, except that in this exemplary embodiment, the clear packets are received, e.g., by virtue of a subscription service, by any suitable mechanism and stored on a hard disc drive or similar device 530. The clear packets can be received in any manner and retrieved as needed from the disc drive 530. The clear packets are thus supplied to STB 512 which operates in a manner similar to that previously described except that the source of clear packets is different.

Thus, a data signal for use in decoding a selectively encrypted data stream, can have a collection of unencrypted data packets corresponding to a set of encrypted data packets, the encrypted data packets forming one set of selectively encrypted packets that represent an encrypted part of the selectively encrypted data stream. Another data signal can have a selectively encrypted data stream in which a set of encrypted packets have been removed and replaced by a set of decrypted packets, wherein the decrypted packets are obtained from a separate source. Either of these data signals can be transmitted or stored in a computer readable storage medium.

Figure 13:
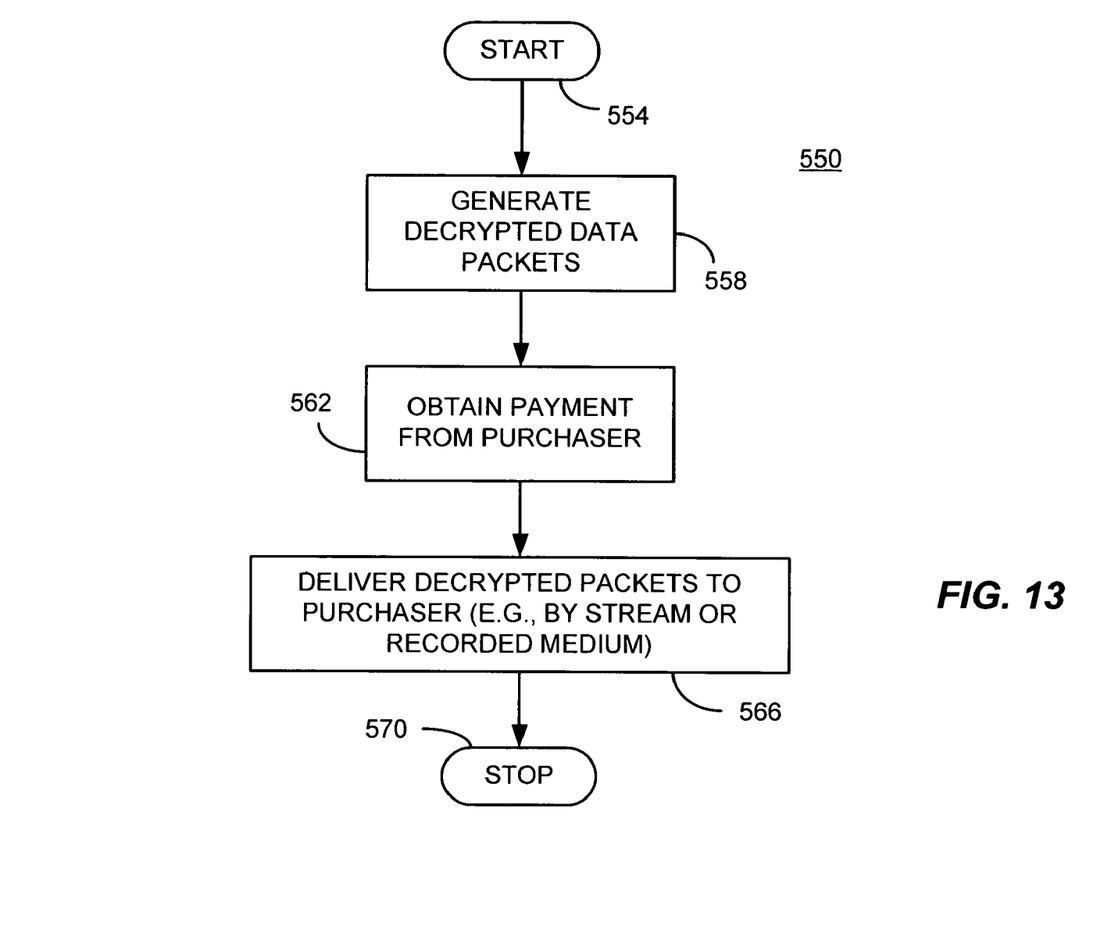
FIG. 13 is a flow chart of a method for providing clear packet data in a manner consistent with certain embodiments of the present invention.

A subscription service can operate according to a method for decoding selectively encrypted content in a manner consistent with process 550 of FIG. 13 starting at 554 which involves generating a set of decrypted data packets at 558 corresponding to a set of encrypted data packets appearing in the selectively encrypted content by decryption of the set of encrypted data packets; obtaining a fee from a purchaser at 562; and delivering the set of unencrypted data packets to the purchaser at 566. The process then stops at 570.

While the above descriptions presume that a television STB is used as the playback device for a cable or satellite broadcast, this should not be considered limiting. The playback device could equally well be equivalently built into a television receiver of any sort or may form a part of a personal computing device without limitation. Moreover, although the preferred embodiment utilizes a cable television or satellite television system as the source of selectively encrypted content, other sources such as packaged media could equivalently be decoded in this manner.

The source of clear packets can provide such clear packets as a subscription service wherein the subscriber purchases, leases or otherwise obtains a STB or personal computing device with appropriate software or installs suitable programming on a commercially available STB or other playback device. In exchange for subscription fees, the user can then obtain copies of the clear packets from the source of clear packets 124 by email or download to the STB 512, and can subsequently decode the encrypted programming.

Those skilled in the art will recognize. upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors which are equivalents. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated clear packet data used to implement certain of the embodiments described above can be implemented using streaming data as well as disc storage and other forms of computer readable storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

While the embodiments above are illustrated using a dual selectively encrypted data stream, single or multiple encrypted data streams can equally well be decoded in the manner taught.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments of the invention have been described, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of generating a set of clear packets used to decode a selectively encrypted data stream, comprising:
   receiving a single selectively encrypted stream of data where the stream comprises both encrypted and non-encrypted packets within the single selectively encrypted stream of data, and where both the encrypted and non-encrypted packets are required to produce a descrambled video image when decoded;
   detecting a plurality of encrypted packets within the selectively encrypted stream of data;
   creating the set of clear packets by decrypting the plurality of encrypted packets detected within the selectively encrypted stream of data and discarding the non-encrypted packets;
   storing the set of clear packets as a computer file separate from the selectively encrypted stream of data; and
   providing the set of clear packets to a decoder that has access to a stream of selectively encrypted data that includes the selectively encrypted data stream so that the decoder produces the descrambled video image by combining the non-encrypted packets of the selectively encrypted data stream with the clear packets to recreate the selectively encrypted data stream in an unencrypted form.

2. The method according to claim 1, further comprising transmitting the file containing the set of clear packets to the decoder, where the decoder is situated at a remote location.

3. A tangible non-transient computer readable storage medium, storing instructions that when executed on one or more programmed processors carry out a process according to claim 1.

4. A method of generating a set of clear packets used to decode a selectively encrypted data stream, comprising:
   receiving a selectively encrypted stream of data where the stream comprises both encrypted and non-encrypted packets within the selectively encrypted stream of data, and where both the encrypted and non-encrypted packets are required to produce a descrambled video image when decoded;
   detecting a plurality of encrypted packets within the plurality of selectively encrypted stream of data;
   creating the set of clear packets by decrypting the plurality of encrypted packets detected within the selectively encrypted stream of data and discarding the non-encrypted packets; and
   transmitting the set of clear packets to a decoder that has access to a stream of selectively encrypted data that includes the selectively encrypted data stream so that the decoder produces the descrambled video image by combining the non-encrypted packets of the selectively encrypted data stream with the clear packets to recreate the selectively encrypted data stream in an unencrypted form, where the decoder is situated at a remote location.

5. A tangible non-transitory computer readable storage medium, storing instructions that when executed on a programmed processor carry out a process according to claim 1.

6. An apparatus for supplying decrypted packets for substitution in place of encrypted packets in a single selectively encrypted data stream, comprising:

an encrypted packet detector that detects a set of encrypted packets in the single selectively encrypted data stream wherein the single selectively encrypted data stream comprises both encrypted and non-encrypted packets and discards packets from the data stream that are not encrypted, and where both the encrypted and non-encrypted packets are required to produce a descrambled video image when decoded;

a decrypter that decrypts the set of encrypted packets in the single selectively encrypted data stream to produce a set of decrypted clear packets; and a storage device that stores the set of decrypted clear packets as a computer file separate from the non-encrypted packets;

where the set of clear packets is accessible by a decoder that is situated at a remote location, where the decoder has access to a stream of selectively encrypted data that includes the selectively encrypted data stream so that the decoder produces the descrambled video image by combining the non-encrypted packets of the selectively encrypted data stream with the clear packets to recreate the selectively encrypted data stream in an unencrypted form and discards the encrypted packets from the selectively encrypted data stream.

7. The apparatus according to claim 6 wherein the storage device comprises one of an optical disc storage device, a magnetic storage device and a semiconductor storage device.

8. An apparatus for supplying decrypted packets for substitution in place of encrypted packets in a single selectively encrypted data stream, comprising:

an encrypted packet detector in a video receiver device that detects a set of encrypted packets in the single selectively encrypted data stream wherein the single selectively encrypted data stream comprises encrypted and non-encrypted packets and discards packets from the data stream that are not encrypted, and where both the encrypted and non-encrypted packets are required to produce a descrambled video image when decoded;

a decrypter that decrypts the set of encrypted packets in the single selectively encrypted data stream to produce a set of decrypted clear packets; and a transmitter device that transmits the decrypted clear packets to a remote location for use by a decoder that has access to a stream of selectively encrypted data that includes the selectively encrypted data stream so that the decoder produces the descrambled video image by combining the non-encrypted packets of the selectively encrypted data stream with the clear packets to recreate the selectively encrypted data stream in an unencrypted form and discarding the encrypted packets from the selectively encrypted data stream.

9. The apparatus according to claim 8, wherein the transmitter device comprises a modem.

* * * * *